(12) United States Patent
Dalmolen et al.

(10) Patent No.: US 6,478,338 B1
(45) Date of Patent: Nov. 12, 2002

(54) COUPLING SLEEVE FOR HIGH-PRESSURE PIPE

(75) Inventors: Lambertus Gerrit Dalmolen, Amsterdam; Hans Edward Guitoneau, Grootebroek, both of (NL)

(73) Assignee: Pipelife Nederland B.V., Enkhuizen (NL)

( * ) Notice: Subject to any disclaimer, the term of this patent is extended or adjusted under 35 U.S.C. 154(b) by 0 days.

(21) Appl. No.: 09/700,233

(22) PCT Filed: May 17, 1999

(86) PCT No.: PCT/NL99/00301

§ 371 (c)(1),
(2), (4) Date: Nov. 13, 2000

(87) PCT Pub. No.: WO99/58894

PCT Pub. Date: Nov. 18, 1999

(30) Foreign Application Priority Data

May 14, 1998 (NL) .............................................. 1009169

(51) Int. Cl.[7] .............................................. F16L 47/02
(52) U.S. Cl. ...................... 285/21.2; 285/21.1; 285/369
(58) Field of Search ............................... 285/21.1, 21.2, 285/369, FOR 21

(56) References Cited

U.S. PATENT DOCUMENTS 4,349,219 A * 9/1982 Sturm ........................ 285/21.2
5,618,065 A * 4/1997 Akiyama ..................... 285/21.2
6,135,508 A * 10/2000 Genoni et al. ............... 285/21.1
6,250,686 B1 * 6/2001 Becker et al. ................ 285/21.2
6,375,226 B1 * 4/2002 Dickinson et al. ........... 285/21.2

FOREIGN PATENT DOCUMENTS

| DE | 3932807 | 5/1991 |
| EP | 0075901 | 4/1983 |
| EP | 0635354 | 1/1995 |
| EP | 0693652 | 1/1996 |
| GB | 2280145 | 1/1995 |
| WO | WO 9104845 | 4/1991 |
| WO | WO 9512086 | 5/1995 |

* cited by examiner

Primary Examiner—Lynne H. Browne
Assistant Examiner—Aaron Dunwoody
(74) Attorney, Agent, or Firm—Handal & Morofsky

(57) ABSTRACT

A coupling sleeve (4) for connecting to at least one pipe section (2,3) fitted in an insertion end (29) thereof comprises an inner bush (5) made of thermoplastic material and an outer bush (6), in which inner bush resistance wires are accommodated, which resistance wires (7) can be connected to an electric power source for melting the surfaces of the coupling sleeve which face each other and those of each pipe section, in order to create a welded joint, which inner bush and outer bush in axial section have parts (8,9) which mesh with each other, in order to transmit axial and/or tangential forces. The inner bush has at least one part with a flank which faces the insertion end and which in an axial plane is determined by a tangent forming an angle of less then 45° with the axis of the inner bush.

31 Claims, 4 Drawing Sheets

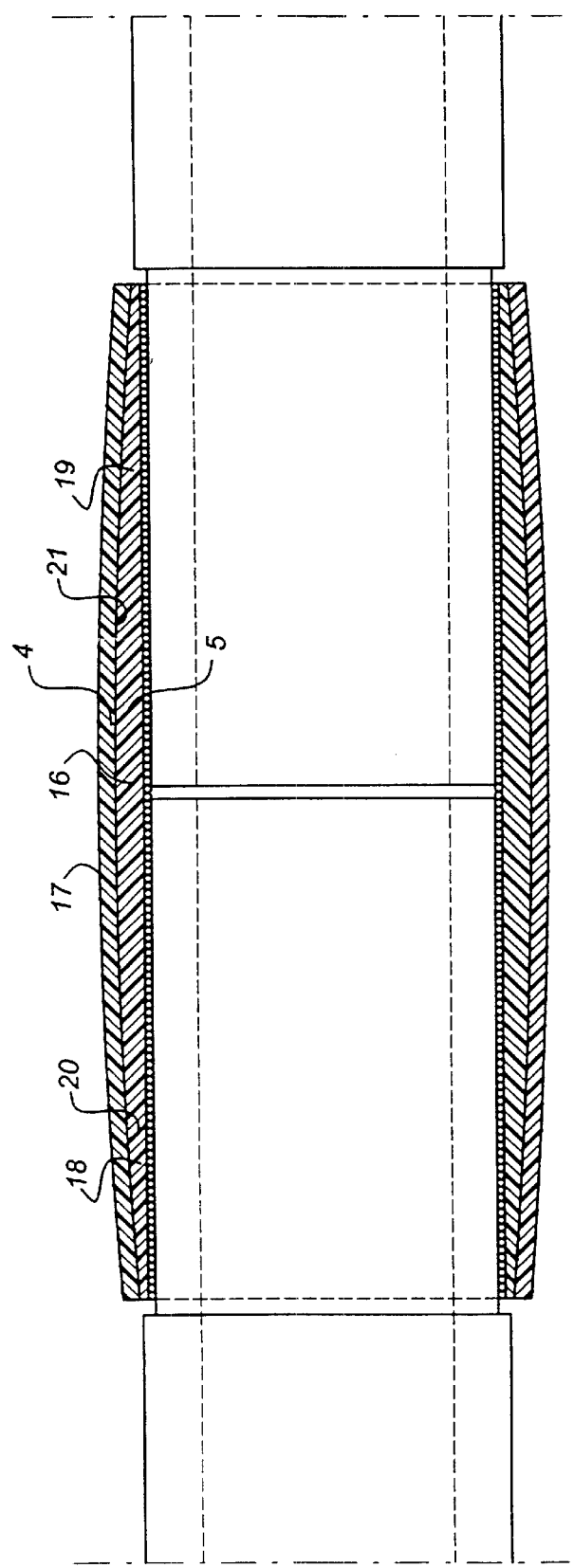

COUPLING SLEEVE FOR HIGH-PRESSURE PIPE

TECHNICAL FIELD

The invention relates to a coupling sleeve for connecting to at least one pipe section fitted in an insertion end thereof, which coupling sleeve comprises an inner bush made of thermoplastic material and an outer bush, in which inner bush resistance wires are accommodated, which resistance wires can be connected to an electric power source for melting the surfaces of the coupling sleeve which face each other and those of each pipe section, in order to create a welded joint, which inner bush and outer bush in axial section have parts which mesh with each other, in order to transmit axial and/or tangential forces.

BACKGROUND OF THE INVENTION

A coupling sleeve of this type for connecting two pipe sections to each other is known from EP-A-693652. This known coupling sleeve has a number of concentric casings which are connected to each other by means of meshing teeth with a block-shaped cross-section. The object of these teeth is first of all to provide better heat dissipation during the moulding of the casings in a mould, and said teeth have the additional advantage of better mutual adhesion of the casings.

SUMMARY OF THE INVENTION

Pursuant to the invention, it has been recognized that a coupling sleeve designed in this way is not suitable for use in the case of high-pressure pipes. In such cases the coupling sleeve is exposed to high tensile forces. The inner bush of the coupling sleeve welded to the ends of two pipe parts is stretched in the process. In view of the uniformity of the forms meshing with each other, the load is concentrated initially on the outermost forms meshing with each other. This causes a give-way mechanism, in which the forms give way one after the other, beginning at the outermost and continuing to the teeth situated further in.

The invention also relates to coupling sleeves which can be fixed to a pipe at the insertion end, and which bear, for example, a fixing flange at the other end.

The object of the invention is to provide a coupling sleeve which is actually suitable for use in the case of high-pressure pipes. That object is achieved by the fact that the inner bush has at least one part with a flank which faces the insertion end and in an axial plane is determined by a tangent forming an angle of less than 45° with the axis of the inner bush.

With such a shape of the meshing forms, a more uniform transmission of forces is obtained, and excessively high tensions in the outermost meshing forms is avoided, and the meshing forms situated further in can also participate in the transmission of forces.

The angle between the tangents and the axis is preferably less than 30°. The most preferred angle is one less than 15°.

The coupling sleeve is connected to each of the pipe sections by means of a continuous circular weld. The transmission of forces between the pipe sections and the coupling sleeve occurs by way of a large weld surface, with the result that a very gradual pattern of forces occurs in the axial direction and tension concentrations are avoided.

In particular, the coupling sleeve can comprise an inner bush made of thermoplastic material and an outer bush, in which inner bush the resistance wires are accommodated.

The desired tensile strength in the direction of both axial ends of the coupling sleeve can be achieved by the fact that the meshing forms have an asymmetrical cross-section relative to a radial plane. The advantage is that the asymmetry gives the parts greater ability to participate in the transmission of axial forces.

This asymmetrical shape occurs, for example, in the case of meshing parts comprising teeth which have an asymmetrical cross-section with a relatively steeply slanting tooth flank and a relatively gently slanting tooth flank. The relatively steeply slanting tooth flank of all meshing parts with an asymmetrical cross-section faces away from the insertion end. These teeth do not contribute to the transmission of forces, and they are therefore kept as short as possible in the axial direction, which results in great steepness. The gradient of the relatively gently slanting tooth flank of the meshing forms which are situated at a relatively great distance from the insertion end of the coupling sleeve is smaller than the gradient of the relatively gently slanting tooth flank of the meshing parts situated a relatively short distance from the insertion end, which produces a transmission of forces distributed uniformly over the coupling sleeve.

The size of the gradients of the relatively gently slanting tooth flanks of the meshing forms decreases monotonically in the direction facing away from the insertion end.

Moreover, the coupling sleeve can be shut off fluently at each end by means of conically tapering parts.

The asymmetrical meshing forms according to the invention can be designed in various variants.

According to a first variant, the inner bush and the outer bush have separate meshing teeth running in the circumferential direction. Such teeth each form an annular thickening relative to the inner bush and the outer bush.

According to a further variant, the inner bush and the outer bush of the coupling sleeve have helically meshing tooth systems. Such a helical shape is suitable for relatively short pipe sections which can be screwed into the sleeve. The tooth system is asymmetrical, but must also have a continuous cross-section, in order to permit the screwing movement.

The coupling sleeve can be designed in various ways, depending on the potential applications. If the coupling sleeve can be pushed onto each pipe section in the axial direction, the coupling sleeve can comprise a bush which is in one piece in the circumferential direction, and in which the resistance wires are accommodated, running in the circumferential direction.

In an alternative embodiment, the coupling sleeve can comprise mutually connecting shells, in which the resistance wires are accommodated, running in the axial direction.

The outer bush is fibre-reinforced for bearing axial and/or tangential forces. The outer bush preferably comprises fibres with a tensile modulus >50 GPa, such as glass fibres, carbon fibres or aramid fibres. The outer bush also preferably comprises a thermosetting material such as polyester, vinyl ester or epoxy resin.

The coupling sleeve according to the invention can be used in various ways. First of all, the coupling sleeve is suitable for connecting two pipe sections to each other. In that case the coupling sleeve can be symmetrical relative to a radial plane of symmetry, and the meshing forms on one side of the plane of symmetry are a mirror-symmetrical shape relative to the meshing forms on the other side of the plane of symmetry.

According to a variant, the inner bush has two external forms, each tapering conically towards an axial end, and the outer bush has two correspondingly shaped internal forms, which outer bush has an essentially constant thickness.

Coupling sleeves comprising an inner bush with electric resistance wires are known. Such inner bushes are of standard dimensions and, in view of the great forces occurring in high-pressure pipes, could sometimes produce an inadequate weld. In order to be able to use such standard components in the case of high-pressure pipes in any case, the coupling sleeve can have at least two separate inner bushes situated next to each other in the axial direction and accommodated in the outer bush.

According to a second variant, the coupling sleeve has one part which is provided with an insertion end for a pipe section, and also has an auxiliary end to which a further element can be fixed. The auxiliary end can be provided with a fixing flange, by means of which the coupling sleeve can be connected to, for example, a tank.

The invention also relates to a sleeve joint between two pipe sections of a high-pressure pipe, which pipe sections each comprise a fluid-tight inner casing made of a thermoplastic material, and also a reinforced outer casing, the inner casings being connected to each other in a fluid-tight manner, and the outer casings being connected to each other by means of a coupling sleeve, as described above.

The inner casings are welded to each other directly at their end faces which face each other.

The sleeve joint can also be designed in such a way that at the ends of the pipe sections facing each other the inner casings are externally unattached. In that case the coupling sleeve has an inner bush with a central part of relatively large diameter, which central part of the inner bush is welded to the external surface of the inner casings.

The outer casings can comprise fibres with a modulus >50 GPa, such as glass fibres, carbon fibres or aramid fibres, embedded in a thermoplastic matrix.

Furthermore, the outer casings can comprise an outside layer of thermoplastic material.

The welded joint between the coupling sleeve and the pipe sections is best achieved if the inner casings and the outer casings and also the inner bush of the coupling sleeve comprise the same thermoplastic material, such as a polyolefin.

A further coupling sleeve is known from WO-A-9512086. This coupling sleeve is particularly suitable for high-pressure pipes, for example suitable for pressures up to 100 bar. The joint in the inner casings of the pipe sections is obtained by welding, and is consequently suitable for ensuring the desired tightness. An example which can be mentioned is pipes for transporting gas and crude oil.

In the case of this known sleeve joint, a coupling sleeve is placed on the ends of the outer casings facing each other. By means of the conical fixing rings, the coupling sleeve is clamped on the outer surface of the outer casing, the coupling sleeve and the pipe sections being deformed locally in order to provide the necessary axial retaining power.

This known sleeve joint has various disadvantages. First of all, the local deformation of the wall of the pipe sections can give rise to tension concentrations, which can lead to giving way, particularly at high pressures.

A further disadvantage is that several loose components have to be used for the joint, which components have to be fitted on the pipe sections beforehand.

BRIEF DESCRIPTION OF THE DRAWINGS

The invention will be described in greater detail below with reference to the exemplary embodiments shown in the figures.

FIG. 4 shows a third variant of the sleeve joint.

DETAILED DESCRIPTION OF THE INVENTION

Figure 1:
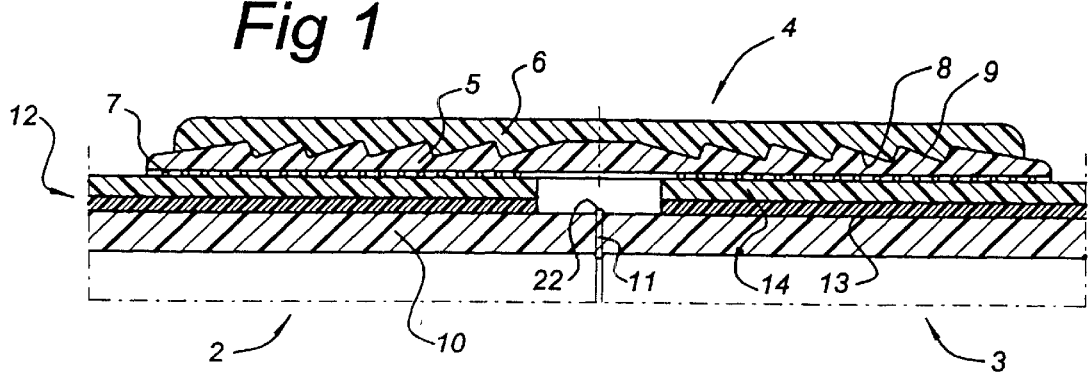
FIG. 1 shows the sleeve joint with the coupling sleeve according to the invention between two pipe sections.

The sleeve joint shown in FIG. 1 between two pipe sections 2, 3 of the high-pressure pipe comprises a coupling sleeve 4. This coupling sleeve is composed of an inner bush 5 made of thermoplastic material, such as a polyolefin, and an outer bush 6 made of a fibre-reinforced thermosetting composite for bearing axial forces. A number of resistance wires 7 are accommodated on the internal surface of the inner bush 5, which resistance wires can be connected to a power source by way of connecting terminals (not shown).

The outer surface of the inner bush bears a tooth system 8 running in the circumferential direction, while the inner surface of the outer bush 6 bears a corresponding tooth system 9. These tooth systems 8, 9 mesh closely with each other, in such a way that the loads exerted on the inner bush, particularly those in the axial direction, can be transmitted reliably to the outer bush 6.

The pipes 2, 3 each consist of a fluid-tight inner casing 10 of a thermoplastic material, preferably of the same material—such as the polyolefin—as the inner bush 5 of the coupling sleeve. These inner casings 10 are fixed to each other in a fluid-tight manner at the position of the weld 11.

The pipes 2, 3 also have an outer casing 12, which is composed of a reinforcement fibre layer 13, with, for example, glass fibres, carbon fibres or aramid fibres incorporated in a thermoplastic matrix, and also an outer layer of thermoplastic protective material 14.

At the position of the weld 11, the outermost layer 14 of thermoplastic material has been removed, in such a way that the bead 22 formed during heated plate welding of the fluid-tight inner casings can be accommodated.

For the formation of the sleeve joint, the thermoplastic material of both the inner bush 5 of the coupling sleeve and of the outermost layer of thermoplastic material 14 of the pipe sections 2, 3 is melted, so that an intimate connection is obtained. After cooling down, the sleeve joint is complete.

The axial tensile forces, which can be considerable in the case of high-pressure pipes, are transmitted by way of the thermoplastic layers 14, 5 and the tooth systems 8,9 to the outer bush of fibre-reinforced material. A reliable and sufficiently strong joint between the pipe sections 2, 3 is ensured as a result.

Figure 3:
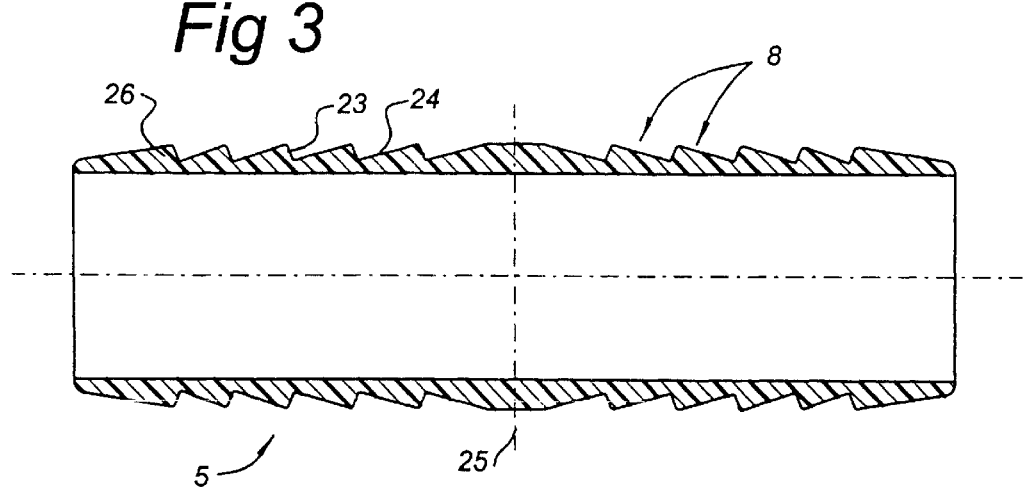
FIG. 3 shows the inner bush of the coupling sleeve on a larger scale.

As also shown in FIG. 3, the teeth 8 (and therefore also the teeth 9) have an asymmetrical form. The flanks 23 facing the plane of symmetry 25 of the inner bush 5 are steeper than the flanks 24 facing away from said plane of symmetry 25. Moreover, the steepness of said flanks 24 facing away from the plane of symmetry 25 increases in the direction towards the end of the inner bush 26 (or decreases in the direction of the plane of symmetry 25).

Figure 2:
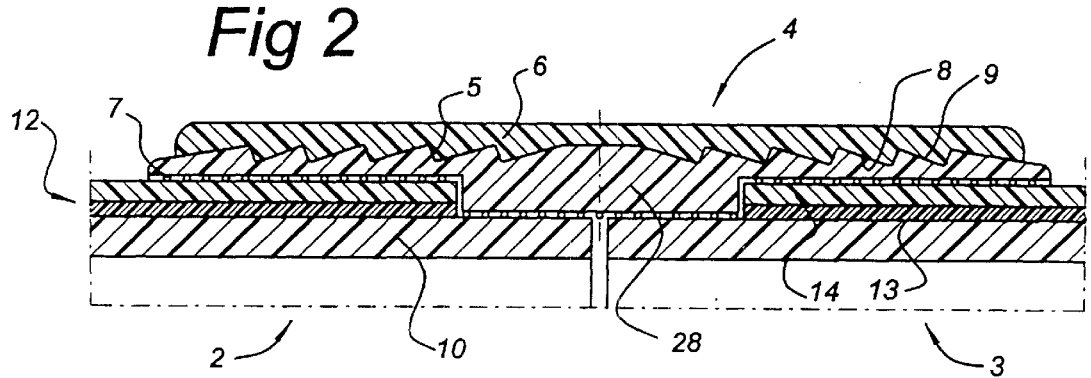
FIG. 2 shows a second variant of the sleeve joint.

The second variant of the sleeve joint according to the invention, shown in FIG. 2, comprises a coupling sleeve 4 with an outer bush 6 and an inner bush 5, which bushes are connected to each other by tooth system 8, 9, corresponding to the variant of FIG. 1.

The inner bush 5 has an inward extending thickened part 28.

Welding wires 7 extend over the entire internal surface of the inner bush 5, in other words, also over said thickened part 28.

The pipe sections 2, 3 each have an inner casing 10 and an outer casing 12, likewise corresponding to the variant of FIG. 1.

However, in the case of the variant of FIG. 2, the inner casings 10 are not welded to each other at their surfaces facing each other. Instead of this, the external surfaces of the inner casings 10, which adjoin the thickened part 28 of the inner bush 5 of the welded joint sleeve 4, are welded to said thickened part. A fluid-tight joint between the inner casings 10 is obtained in this way.

The inner bush 5 is also welded to the outer casing 12. Further working of the welded joint sleeve 4 shown in FIG. 2 is the same as that of FIG. 1.

Figure 3A:
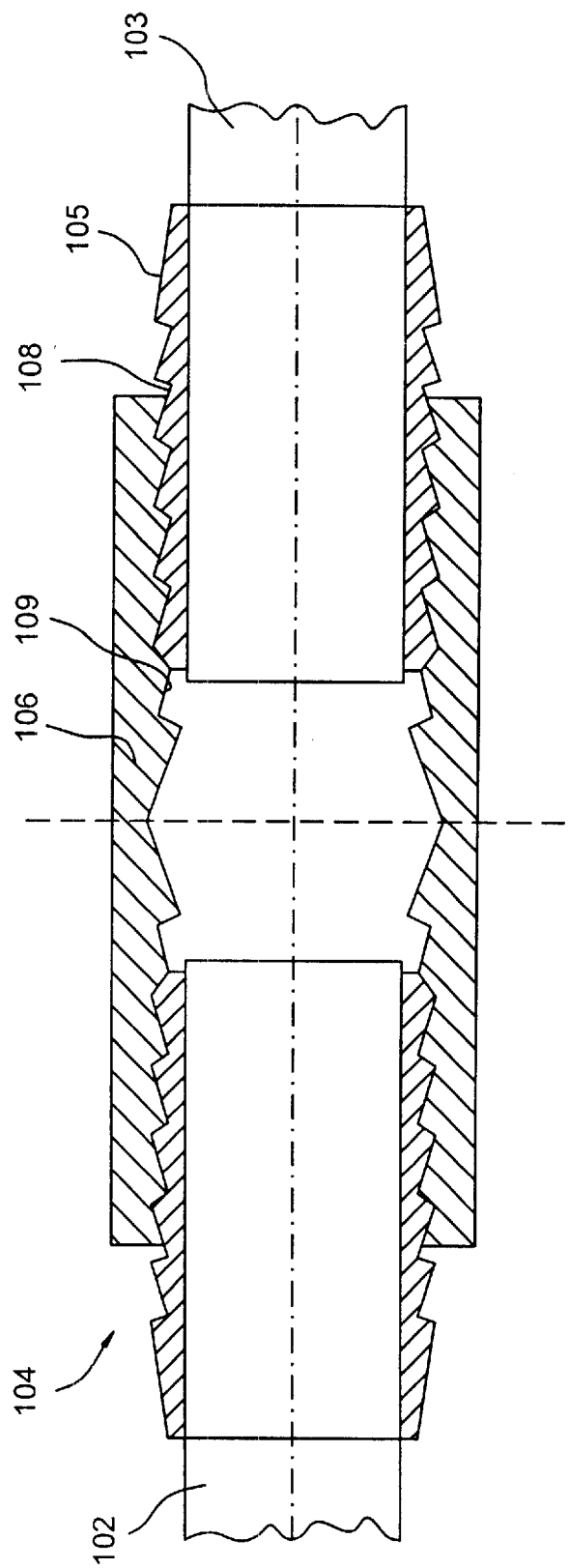
FIG. 3a shows another sleeve joint according to the invention wherein the inner and the outer bush of the coupling sleeve have a helically meshing tooth system.

The alterative embodiment of the sleeve joint shown in FIG. 3a comprises two pipe sections 102, 103 and a coupling sleeve 104 having an inner bush 105 and an outer bush 106.

The outer surface of the inner bush 105 and the inner surface of the outer bush 106 bear respective helically meshing tooth systems 108, 109. Such a helical shape is suitable for relatively short pipe sections 102, 103 which can be screwed into the sleeve 104. The tooth system is asymmetrical, and has a continuous cross-section, to permit the screwing movement.

The variant shown in FIG. 4 comprises an inner bush 16 which has two conical parts 18, 19. Said conical parts 18, 19 fit tightly into the correspondingly shaped conical hollows 20, 21 of the outer bush 17. Owing to these shapes, the axial and tangential forces between the inner bush 16 and the outer bush 17 are transmitted in a reliable manner.

Figure 5:
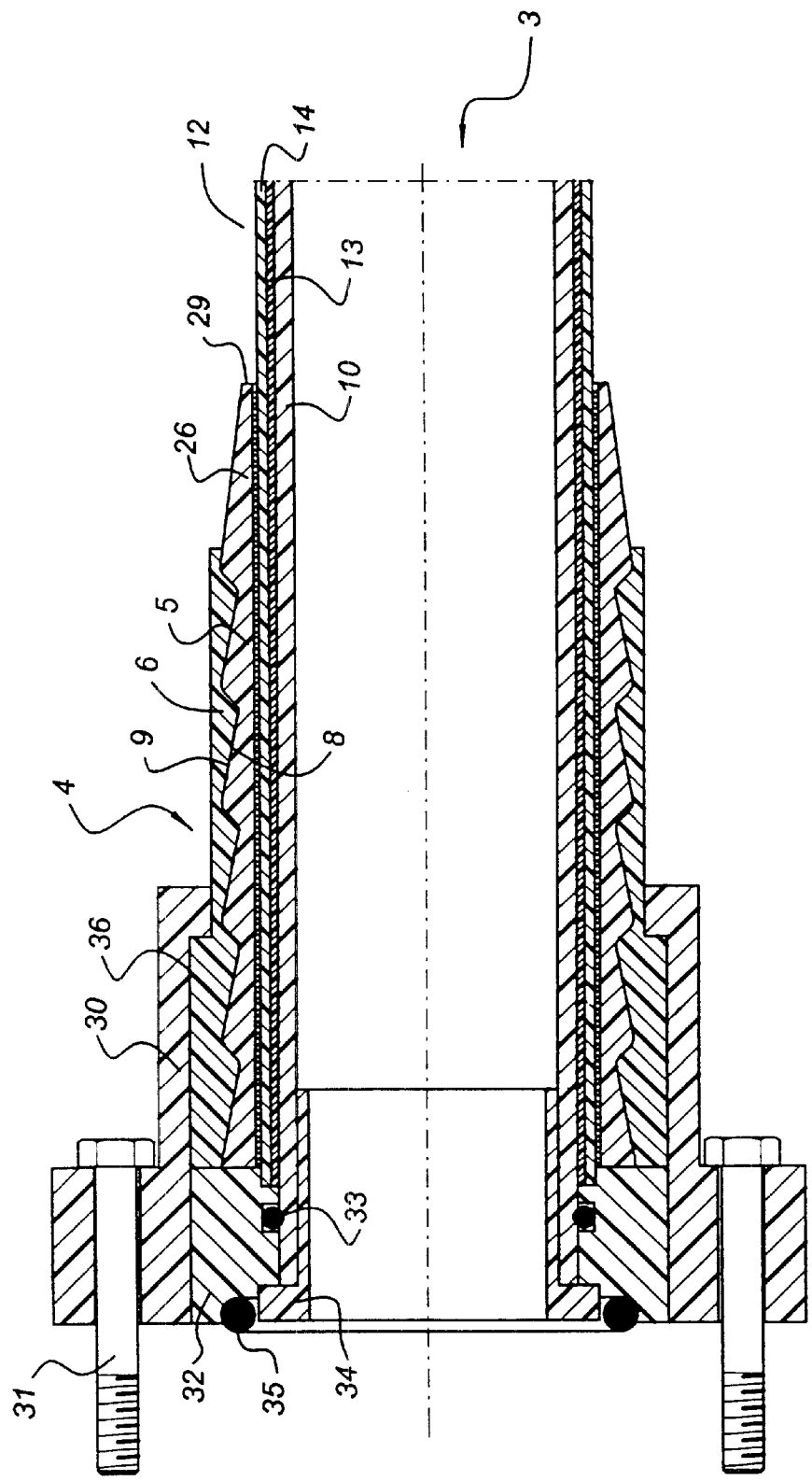
FIG. 5 shows a sleeve joint with flange.

In the variant of FIG. 5 the coupling sleeve 4 is hooked by means of thickening 36 behind the fixing flange 30, which in turn can be fixed by means of bolts 31 to, for example, a holder.

The coupling sleeve is pressed against a ring 32, which is sealed by means of O-ring 33 relative to the inner casing 10 of pipe section 3, and by means of O-ring 35 can be sealed relative to, for example, an edge around a hole.

The casing 10 is retained by means of bush 34.

What is claimed is:

1. A coupling sleeve for connecting one pipe section to another pipe section, or to an auxiliary part and for forming a pipe section weld between the pipe sections or between the pipe section and the auxiliary part, the one pipe section having a longitudinal axis and an end portion, the end portion of the pipe section being insertable along said longitudinal axis into an end of the coupling sleeve, the coupling sleeve comprising:
    (a) an inner bush comprising thermoplastic material and having an inner surface to contact the pipe section and an outer surface;
    (b) an outer bush having an inner surface and an outer surface, the outer bush inner surface and the inner bush outer surface having mutually engaging teeth to transmit loads from the inner bush to the outer bush wherein, in axial cross section, each inner bush tooth is pointed and points away from the pipe section longitudinal axis with a flank on one side of the tooth point being oriented to face the pipe section end and slanting relatively steeply with respect to the pipe section longitudinal axis and a flank on the other side of the tooth point oriented to face away from the pipe section end and slanting relatively gently with respect to the pipe section longitudinal axis; and
    (c) at least one resistance wire accommodated by the inner surface of the inner bush, wherein the resistance wire can be connected to an electric power source to provide heat to melt the thermoplastic material and to form the pipe section end.

2. A coupling sleeve as claimed in claim 1, wherein the relatively gently slanting flanks slant at an angle of less than 33°, optionally less than 15°, with respect to the inner bush longitudinal axis.

3. A coupling sleeve as claimed in claim 1, wherein the inner bush teeth are symmetrically disposed on either side of the joint location whereby the relatively steeply slanting flanks of the teeth on one side of the joint location face the relatively steeply slanting flanks on the other side of the joint location.

4. A coupling sleeve as claimed in claim 1, wherein the relatively steeply slanting teeth flanks of the inner bush face away from the insertion end of the coupling sleeve.

5. A coupling sleeve as claimed in claim 1, wherein the gradient of each relatively gently slanting tooth flank of the inner bush situated at a relatively lesser distance from the insertion end is smaller than the gradient of a relatively gently slanting tooth flank of the inner bush situated at a relatively greater distance from the insertion end.

6. A coupling sleeve as claimed in claim 5, further comprising a plane of symmetry perpendicular to a longitudinal axis of the coupling sleeve, optionally at a center point of the longitudinal axis of the coupling sleeve, wherein the angles of the gradients of the relatively gently slanting tooth flanks decrease, optionally linearly, in the direction along the longitudinal axis toward the plane of symmetry.

7. A coupling sleeve as claimed in claim 1, wherein the inner bush tapers conically toward the inner bush ends.

8. A coupling sleeve as claimed in claim 1, wherein the inner bush and the outer bush have multiple separate mating teeth each said tooth having a continuous circumferential extent.

9. A coupling sleeve as claimed in claim 1, wherein the inner bush and outer bush have helically mating teeth.

10. A coupling sleeve as claimed in claim 1, wherein the outer bush is fiber-reinforced for bearing axial or tangential forces, or axial and tangential forces.

11. A coupling sleeve as claimed in claim 10, wherein the outer bush comprises fibers with a tensile modulus greater than 50 Gpa, optionally glass fibers, carbon fibers or aramid fibers.

12. A coupling sleeve as claimed in claim 1, wherein the outer bush comprises a thermosetting material optionally a polyester, a vinyl ester or an epoxy resin.

13. A coupling sleeve as claimed in claim 1, wherein the inner bush is in one piece in the circumferential direction, and the resistance wires are disposed on the inner surface of the inner bush and run in the circumferential direction.

14. A coupling sleeve as claimed in claim 1, wherein the inner bush comprises mutually connecting shells and the resistance wires run in the axial direction.

15. A coupling sleeve as claimed in claim 1, wherein the coupling sleeve is in one piece having an insertion end for the pipe section, and an auxiliary end for fixing the auxiliary part.

16. A coupling sleeve as claimed in claim 15, wherein the auxiliary end is fixed to a fixing flange.

17. A coupling sleeve as claimed in claim 15, wherein the inner bush comprises at least two separate inner bush sections situated next to each other in the axial direction and accommodated in the outer bush.

18. A sleeve joint between two pipe sections of a high-pressure pipe, wherein the pipe sections each comprise a fluid-tight inner casing made of a thermoplastic material, a reinforced outer casing and an end of the pipe sections, the pipe section ends facing each other, the inner casings being connected to each other in a fluid-tight manner and the outer casings being connected to each other by means of a coupling sleeve as claimed in claim 1.

19. A sleeve joint as claimed in claim 18, wherein the inner casing end faces are directly welded to each other.

20. A sleeve joint as claimed in claim 18, wherein at the ends of the pipe sections the inner casings have free external surfaces and the coupling sleeve has an inner bush with a central part of relatively large diameter, the central part of the inner bush being welded to the external surface of the inner casings.

21. A sleeve joint as claimed in claim 18 wherein the outer casings comprise fibers with a modulus greater than 50 GPa, optionally glass fibers, carbon fibers or aramid fibers, embedded in a thermoplastic material.

22. A sleeve joint as claimed in claim 18, wherein the inner casings and the outer casings and also the inner bush of the coupling sleeve comprise the same thermoplastic material, optionally a polyolefin.

23. A sleeve joint as claimed in claim 21, wherein the outer casings comprise an outermost layer of thermoplastic material optionally, a polyolefin.

24. A coupling sleeve for connecting one pipe section to another pipe section, or to an auxiliary part, and for forming a pipe section weld between the pipe sections or between the pipe section and the auxiliary part, the one pipe section having a longitudinal axis and an end portion, the end portion of the pipe section being insertable along said longitudinal axis into the coupling sleeve, the coupling sleeve being symmetrical on either side of a radial plane of symmetry perpendicular to the pipe section longitudinal axis and comprising:

(a) an inner bush comprising thermoplastic material and having an inner surface to contact the pipe section and an outer surface;

(b) an outer bush having an inner surface and an outer surface, the outer bush inner surface conforming with the inner bush outer surface along the length of at least one of the sleeves and around the inner bush outer surface; and (c) at least one resistance wire accommodated by the inner surface of the inner bush, wherein the resistance wire can be connected to an electric power source to provide heat to melt the thermoplastic material and to for the pipe section; wherein the resistance wire has an extent along the coupling sleeve and the inner bush outer surface tapers away from the plane of symmetry throughout the longitudinal extent of the resistance wire.

25. A coupling sleeve as claimed in claim 24, wherein the inner bush comprises at least two separate inner bush sections situated next to each other in the axial direction and accommodated in the outer bush.

26. A coupling sleeve as claimed in claim 24, wherein the outer bush has a constant thickness along its longitudinal axis.

27. A coupling sleeve as claimed in claim 24, wherein the outer bush surface is convexly curved in both the circumferential and longitudinal directions.

28. A coupling sleeve as claimed in claim 24, wherein the resistance wire and the inner and outer bushes have the same longitudinal extent.

29. A sleeve joint between two pipe sections of a high-pressure pipe, wherein the pipe sections each comprise a fluid-tight inner casing made of a thermoplastic material, a reinforced outer casing and a pipe section end, the pipe section ends facing each other, the inner casings being connected to each other in a fluid-tight manner and the outer casings being connected to each other by means of a coupling sleeve as claimed in claim 24.

30. A sleeve joint as claimed in claim 29, wherein the inner casings are welded to each other directly at their end faces, wherein the end faces face each other, the inner casings having free external surfaces and the coupling sleeve has an inner bush with a central part of relatively large diameter, the central part of the inner bush being welded to the external surface of the inner casings, the outer casings comprise fibers with a modulus >50 GPa, optionally glass fibers, carbon fibers or aramid fibers, embedded in a thermoplastic material and an outermost layer of thermoplastic material, optionally, a polyolefin.

31. A coupling sleeve for connecting at least one pipe section to another pipe section, or an auxiliary part, to create a pipe section weld between the pipe sections or the pipe section and the auxiliary part, the pipe section having a longitudinal axis and an end portion of the pipe section being inserted along the longitudinal axis into the coupling sleeve, the coupling sleeve comprising:

(a) an inner bush comprising thermoplastic material and having an inner surface contacting the pipe section and an outer surface comprising at least one flank, each flank rising radially outwardly toward a joint at a rise angle of less 45°, the rise angle being defined by the interaction of a tangent to the flank with the pipe section longitudinal axis;

(b) an outer bush comprising an inner surface and an outer surface, the inner surface comprising multiple flanks, the flanks having an angular axial cross-section capable of mating with the at least one flank of the inner bush wherein the mating flanks are comprised by teeth, each tooth having a relatively steeply slanting flank and a relatively gently slanting flank on the opposed side of a radial plane through the respective tooth, the radial plane being perpendicular to the longitudinal axis of the pipe; and (c) at least one resistance wire disposed between the inner bush and the pipe section, wherein the resistance wire can be electrically powered to provide heat for melting adjoining surfaces of the inner bush and the pipe section, the melted sections forming a pipe section end t o transmit axial or tangential forces, or transmit axial and tangential forces from the inner bush to the outer bush.

* * * * *